United States Patent [19]

Hart et al.

[11] Patent Number: 4,536,524

[45] Date of Patent: Aug. 20, 1985

[54] MICROENCAPSULATED EPOXY ADHESIVE SYSTEM

[75] Inventors: Ronald L. Hart, Xenia; Dale E. Work, London, both of Ohio; Colin E. Davis, Portage, Mich.

[73] Assignee: Capsulated Systems, Inc., Dayton, Ohio

[21] Appl. No.: 388,564

[22] Filed: Jun. 15, 1982

Related U.S. Application Data

[63] Continuation-in-part of Ser. No. 256,219, Apr. 21, 1981, abandoned.

[51] Int. Cl.³ .............................. C09J 3/14; C09J 3/16
[52] U.S. Cl. ........................................... 523/176; 156/330; 411/258; 428/402.21; 523/211; 523/406
[58] Field of Search ................. 523/176, 211; 156/330; 411/258; 428/402.21

[56] References Cited

U.S. PATENT DOCUMENTS

| | | | |
|---|---|---|---|
| 2,705,223 | 3/1955 | Renfrew et al. | 525/533 |
| 3,041,289 | 6/1962 | Katchen et al. | 264/4.3 X |
| 3,061,455 | 10/1962 | Anthony | 411/258 |
| 3,179,143 | 4/1965 | Schultz et al. | 411/82 |
| 3,395,105 | 7/1968 | Washburn et al. | 523/211 |
| 3,396,116 | 8/1968 | Adams et al. | 252/182 |
| 3,642,937 | 2/1972 | Deckert et al. | 525/58 |
| 3,657,379 | 4/1972 | Hilbelink et al. | 428/402.2 X |
| 3,725,501 | 4/1973 | Hilbelink et al. | 156/332 X |
| 3,746,068 | 7/1973 | Deckert et al. | 411/258 |
| 3,814,156 | 6/1974 | Bachmann et al. | 523/176 X |
| 3,839,220 | 10/1974 | Barchas | 252/305 |
| 4,059,136 | 11/1977 | Wallace | 411/258 |
| 4,081,012 | 3/1978 | Wallace | 411/258 |
| 4,098,736 | 7/1978 | Li et al. | 428/402.2 X |
| 4,136,774 | 1/1979 | Ghoshal | 206/219 |
| 4,164,971 | 8/1979 | Strand | 428/402 X |
| 4,219,604 | 8/1980 | Kakimi et al. | 264/4.7 X |
| 4,224,971 | 9/1980 | Müller et al. | 411/15 |
| 4,273,672 | 6/1981 | Vassiliades | 264/4.1 |
| 4,285,378 | 8/1981 | Wallace | 411/258 |
| 4,292,110 | 9/1981 | Marteness | 156/92 |
| 4,308,165 | 12/1981 | Vassiliades et al. | 428/402.21 |
| 4,325,985 | 4/1982 | Wallace | 427/54.1 |

FOREIGN PATENT DOCUMENTS 1265489  3/1972  United Kingdom.

*Primary Examiner*—Richard D. Lovering
*Attorney, Agent, or Firm*—Biebel, French & Nauman

[57] ABSTRACT

A microencapsulated epoxy adhesive system is disclosed comprising in admixture epoxy resin capsules and encapsulated Ancamine TL (Pacific Anchor Chemical Co.) as the curing agent. When applied, for example to a zinc plated bolt and the bolt is tightened, the capsules break and the resin cures and provides good breakaway torques.

1 Claim, No Drawings

MICROENCAPSULATED EPOXY ADHESIVE SYSTEM

CROSS-REFERENCE TO RELATED APPLICATIONS

This application is a continuation-in-part of Ser. No. 256,219 filed Apr. 21, 1981 now abandoned.

BACKGROUND OF THE INVENTION

The present invention relates to an encapsulated epoxy adhesive system and, more particularly, to a water based adhesive system employing a hydrophobic curing agent.

Most common epoxy adhesives are prepared from a two-part system comprising an epoxy resin and a curing agent. Prior to application, the two parts are mixed and the resin and curing agent mixture are applied to the bonding site where the resin is cured into a hard adherent mass. The common two-part adhesive system is inconvenient to work with because the two parts must be mixed and the adhesive cannot be applied directly to the bond site. One of the techniques that has been used to make the two part system more convenient has been to microencapsulate the epoxy resin and the curing agent. Encapsulated resin and curing agent do not react. Therefore, a mixture of the capsules can be formed and applied directly to a bonding site. There, when the capsules are broken the resin and curing agent react and the epoxy resin bonds. Encapsulated adhesive systems such as this have been employed with threaded fasteners. The encapsulated resin and curing agent are applied to the fastener. As the fastener is tightened, the capsules break and the adhesive bond is formed.

Some of the problems which have been associated with prior epoxy adhesive systems have been that the curing agents used are relatively hygroscopic and have a short shelf life, and the systems have employed a polymeric vehicle. Capsules of curing agent produced by prior encapsulation techniques have been to some extent moisture permeable and the shelf life of the system has not been appreciably enhanced. In accordance with the present invention these drawbacks have been overcome by an encapsulated adhesive system employing a hydrophobic and therefore less hygroscopic curing agent. In accordance with a preferred embodiment of the invention, the polymeric vehicle is replaced by water without sacrificing the adhesive qualities of a polymer based system.

The system of the present invention has the following advantages:

1. Much higher breakaway torques.
2. Much greater consistency and reproducibility.
3. Much less moisture sensitivity which means coated bolts may not have to be protected from the environment.
4. Much longer pot-life. This enables a 1-part ready-to-apply aqueous based epoxy adhesive.

DETAILED DESCRIPTION OF THE INVENTION

In accordance with the present invention an encapsulated epoxy adhesive system is provided comprising epoxy resin capsules and an encapsulated hydrophobic curing agent. The curing agent is preferably Ancamine TL by Pacific Anchor Chemical Corp. Ancamine TL is a 45% solution of methylene dianiline in a non-volatile plastizer.

The epoxy system of the present invention is prepared by forming epoxy resin capsules. These capsules can be formed using techniques which are well known in the art. One convenient method is to form a polyvinyl alcohol capsule wall via coacervation and graft onto it a urea-resorcinol-formaldehyde resin. Epon 828 by Shell Oil Co. is a suitable epoxy resin but those skilled in the art will recognize that other epoxy resins can be used. These capsules may range in size from about 10 to about 1000$\mu$ and preferably 50 to 150$\mu$. Normally the epoxy content of the capsules is on the order of 86%. The capsules may be used as a free flowing powder although it is not necessary to isolate them.

The epoxy capsules are, in one embodiment of the invention, mixed with a coacervate emulsion of the curing agent. Using Ancamine TL as an example, this is accomplished by (1) dispersing a 75% solution of Ancamine TL in xylene into a Glevitol 20–90 PVA solution as 50–100$\mu$ droplets, (2) at about 45° C. coacervating the PVA and promoting encapsulation of the Ancamine TL by the sequential addition of solutions of gum arabic, resorcinol and sodium sulfate, (3) allowing the swollen walled capsules to settle overnight, and (4) decanting off the supernatant phase and gently agitating the coacervate phase with a spatula to produce a 1°20$\mu$ "coacervate emulsion" of the Ancamine TL.

Thereafter the epoxy capsules are added to the emulsion together with sufficient binder solution to prepare a slurry with a viscosity suitable for hand application. One such formulation is shown in the table below:

| Coating Formulation | |
| --- | --- |
| Epoxy Capsules | 4.0 parts |
| Cocervate emulsion | 4.0 parts |
| Binder Solution | As required |

A suitable binder for the above formulation is a solution of 2.5% Elvanol PVA 71–30 and 0.5% Kelzans xanthum gum.

Another method of preparing the Ancamine TL coacervate emulsion is by preparing the PVA-resorcinol coacervate without the curing agent and decanting off the supernatant after settling overnight. Then the Ancamine TL curing agent is emulsified into the coacervate using the Waring Blender and with or without the addition of some of the supernatant to adjust viscosity. The emulsion prepared by this method will be referred to as a "precoacervate emulsion".

In accordance with a preferred embodiment of the present invention, water is substituted for the xanthum gum/PVA binder solution in the coating formulation discussed above. It has been found that in some applications no viscosity builder or added binder is necessary. The PVA coacervate serves as the binder. In addition, by eliminating the xanthum gum which promotes bacterial growth, the problem caused by the limited shelf life of this component is eliminated. Initial testing indicates that the test results obtained through use of water as the diluent in the coating formulation are comparable to those obtained through use of the xanthum gum/PVA binder. Preparing this formulation, it is been found desirable to use less water in preparing the Ancamine TL coacervate emulsion. The result is a coacervate emulsion from which a supernatant phase need not be decanted, and which requires no additional water as a binder for the preparation of the coating formulation. The entire process can be carried out in much less time than that required by the original procedure, for example, a total manufacturing time of 2.5 hours. Initial test results are very encouraging. Settling of the coacervateAncamine TL complex does occur during storage, but is not expected to present any formulation or coating difficulties.

In comparison to a system containing a binder, it has been found that a simple water dilution provides good breakaway torques, but addition of a binder may provide better prevailing-off torques in some cases. This may be due to the binder system filling the bolt threads to a greater extent. The water-no binder system is more cost effective and production-oriented.

In another embodiment of the invention, it has been found that the presence of filler in the encapsulated epoxy coating formulation improves prevailing off torque. When the encapsulated adhesive is applied to a fastener which is tightened, the filler is believed to pack around the threads of the fastener increasing abrasive interference and thereby increasing the force necessary to back the fastener off. A typical filler useful in the present invention is fumed silica such as Syloid 244 (W. R. Grace & Co.). The filler may be used in amounts ranging from about 0.2 to 15% by weight based on the weight of the coating formulation. Amounts on the order of 3% by weight are preferred.

The present invention is illustrated in more detail by the following non-limiting example.

EXAMPLE

Epoxy Capsule Preparation 150 ml of a 5% by weight aqueous solution of Gelvatol 20-90 (a partially hydrolized polyvinyl alcohol manufactured by Monsanto Chemical Co. having a hydrolization degree of about 85.5 to 88.7%, a molecular weight of about 125,000 and a viscosity of 35 to 45 centipose in a 4% by weight aqueous solution at 20° C.) and 100 ml of distilled water are placed in a beaker equipped with a turbine blade agitator and stirred while heating to 75° C. In a separate beaker 15 g of gum arabic in 135 ml distilled water is heated to 65° C. In a third container 150 ml of Epon 828 (a liquid epoxy resin manufactured by Shell Chemical Co.) is heated to 65° C. The liquid epoxy resin is poured into the polyvinyl alcohol solution while stirring. Agitation of the mixture is increased to produce a droplet size of about 50 to 200 microns. Thereafter, the gum arabic solution is slowly added. Agitation is reduced to prevent further emulsification but maintained at a level sufficient to retard coalesence of the internal phase droplets. The beaker contents are cooled to 45° C. and 4 g urea and 8 g resorcinol and 40 ml distilled water are added drop wise to the beaker from a dropping funnel. Five minutes after the completion of the addition, 10 ml of 10% (v/v) aqueous sulfuric acid solution is added to the beaker. Five minutes after the acid addition, 20 ml of 37% methanol-inhibited formalin is slowly poured into the beaker.

One hour after the formalin addition, 3 g urea, 5 g resorcinol, 40 ml distilled water, and 20 ml of 37% formaldehyde solution are added while the temperature of the beaker is held at 45° C. Agitation is continued for 16 hours at 45° C. The pH of the beaker is adjusted to 4.5 using a 10% aqueous solution of sodium hydroxide and the contents of the beaker are agitated an additional 15 minutes and removed from the heat source and set aside.

After the contents of the beaker settle, the supernatant liquid is removed and the microcapsules which result are washed five times by decantation using distilled water and filtered on coarse filter paper and dried to a free flowing powder.

Coacervate Emulsion Preparation 150 ml of a 5% by weight aqueous solution of Gelvatol 20-90 and 100 ml of distilled water are added to a beaker equipped with a turbine blade agitator. With stirring, the contents of the beaker are heated to 60° C. In a separate container 15 g of gum arabic in 135 ml distilled water is heated to 60° C.

75 ml of liquid Ancamine TL curing agent and 25 ml p-xylene are mixed in a third container and heated to 60° C. The Ancamine TL is poured into the polyvinyl alcohol solution with stirring and the contents of the beaker are agitated to form an emulsion having a droplet size of approximately 100 microns. Thereafter, the gum arabic solution is slowly added and agitation is reduced to prevent further emulsification but maintained at a level sufficient to retard coalescence. Agitation is continued until droplets of polymer-rich coacervate are microscopically visable. Thereafter the beaker is cooled to 45° C.

1 g urea, 10 g rescorcinol and 40 ml distilled water are added dropwise to the polymer rich coacervate. Upon completion of this addition, transparent complex coacervate walls surround the Ancamine TL internal phase. These walls are hardened and densified by adding dropwise 25 ml of a solution of 7.5 g anhydrous sodium sulfate in 92.5 ml distilled water. Upon stirring for 15 minutes, soft microcapsules settle to the bottom of the beaker. The supernatant liquid is decanted and a viscous yellow slurry of Ancamine TL droplets is obtained which is further agitated to reduce the droplet size to the 1-20 micron range.

Coating Formulation Preparation 4 g coacervate emulsion and 4 g microencapsulated epoxy resin are combined with 0.3 g fumed silica (Syloid 244). Distilled water is added to the composition to adjust the viscosity to a consistency suitable to form a coatable slurry suitable for application to the threaded fasteners. The slurry is gently stirred until all components are thoroughly dispersed.

The coating composition prepared as above is applied by hand to threaded bolts and dried for 15 minutes in an oven at 100° C. Mating nuts can be applied to these threaded bolts at any time up to at least 6 months with no loss in locking performance. The adhesive system of the present invention is cured by breaking the microcapsules such that the resin and curing agent contact and react.

Prior to curing and after application, the coating should be allowed to dry. If it does not, the breakaway torque is diminished and the results are not as reproducible. A typical drying condition is 15 minutes at 100° C. Excessive heating may volatize components necessary for an optimum cure that yield good breakaway torques, but a certain amount of drying is essential to eliminate excess moisture from the coating. A coating which is more thoroughly dried in a relatively rapid manner may provide more abrasive interference and, therefore, higher prevailing off torques. The effect of the drying conditions on the adhesive system illustrated in the Example is shown below.

| Drying Conditions | Prevailing Off Torque | Breakaway Torque (inch-pounds) |
| --- | --- | --- |
| 5 min. at 100° C. | 67 | 182 |
| 10 min. at 100° C. | 76 | 151 |
| 15 min. at 100° C. | 97 | 158 |
| 5 min. at 75° C. | 12 | 103 |
| 10 min. at 75° C. | 26 | 142 |
| 15 min. at 75° C. | 32 | 173 |
| 20 min. at 75° C. | 79 | 180 |
| 5 hours at ambient | 19 | 178 |

The effect of the epoxy capsule size on the torque is shown in the following table for thread adhesive system of the example.

| Capsule Size (microns) (Majority of Capsules) | Prevailing Off Torque | Breakaway Torque (inch-pounds) |
| --- | --- | --- |
| 50-150 | 74 | 158 |
| 50-150 | 61 | 149 |
| 100 | 61 | 130 |
| 125 | 47 | 206 |
| 53 | 86 | 168 |
| 50-150 | 59 | 170 |
| 150 | 51 | 154 |

The table below shows the effect of cure time on the torques for the example system.

| Cure Time | Prevailing Off Torque | Breakaway Torque (inch-pounds) |
| --- | --- | --- |
| 8 hours | 18 | 55 |
| 16 hours | 55 | 180 |
| 24 hours | 68 | 214 |
| 48 hours | 65 | 192 |
| 72 hours | 106 | 190 |

Having described my invention in detail and by reference to preferred embodiments thereby it will be apparent to those skilled in the art that numerous variations and modifications thereof are possible without departing from the invention as claimed.

What is claimed is:

1. An aqueous based epoxy adhesive system, comprising:
a coacervate of polyvinyl alcohol; a solution of methylene dianiline; and microcapsules containing an epoxy resin; said polyvinyl alcohol coacervate comprising a continuous phase in which said methylene dianiline solution and said epoxy microcapsules are dispersed.

* * * * *